United States Patent
Fairy

(10) Patent No.: US 7,686,603 B2
(45) Date of Patent: Mar. 30, 2010

(54) HOT RUNNER ACTUATOR

(75) Inventor: Fabrice Fairy, Georgetown (CA)

(73) Assignee: Mold-Masters (2007) Limited, Georgetown (CA)

(*) Notice: Subject to any disclaimer, the term of this patent is extended or adjusted under 35 U.S.C. 154(b) by 211 days.

(21) Appl. No.: 12/034,323

(22) Filed: Feb. 20, 2008

(65) Prior Publication Data
US 2008/0199553 A1 Aug. 21, 2008

Related U.S. Application Data

(60) Provisional application No. 60/891,009, filed on Feb. 21, 2007.

(51) Int. Cl.
*B29C 45/23* (2006.01)
(52) U.S. Cl. .................. 425/130; 425/564
(58) Field of Classification Search ........... 425/562, 425/563, 564, 565, 566, 130
See application file for complete search history.

(56) References Cited

U.S. PATENT DOCUMENTS

| | | | | |
|---|---|---|---|---|
| 4,330,258 | A * | 5/1982 | Gellert | 425/564 |
| 4,775,308 | A * | 10/1988 | Schad et al. | 425/562 |
| 4,783,298 | A * | 11/1988 | Oda | 425/566 |
| 5,121,042 | A | 6/1992 | Ako | |
| 5,556,582 | A | 9/1996 | Kazmer | |
| 6,003,428 | A | 12/1999 | Mundie et al. | |
| 6,183,239 | B1 | 2/2001 | Belous | |
| 6,228,309 | B1 | 5/2001 | Jones et al. | |
| 6,294,122 | B1 | 9/2001 | Moss | |
| 6,638,049 | B1 | 10/2003 | Moss et al. | |
| 6,866,171 | B2 | 3/2005 | Ickinger | |
| 7,270,537 | B2 | 9/2007 | Doyle et al. | |
| 2005/0048162 | A1 | 3/2005 | Teng et al. | |
| 2005/0123641 | A1 | 6/2005 | Kim | |
| 2006/0065991 | A1 | 3/2006 | Tabassi et al. | |
| 2006/0263468 | A1 | 11/2006 | Schunke | |
| 2007/0122519 | A1 | 5/2007 | Yu | |
| 2007/0273060 | A1 | 11/2007 | Doyle et al. | |

FOREIGN PATENT DOCUMENTS

| | | |
|---|---|---|
| DE | 199 56 215 C2 | 6/2001 |
| EP | 0 970 794 A1 | 1/2000 |
| JP | 2-178012 A | 7/1990 |
| JP | 5-200788 A | 8/1993 |

(Continued)

OTHER PUBLICATIONS

"Tol-O-Matic announces the ServoGate electric linear actuator designed specifically for valve gating", *Tol-O-Matic Announcement*, date unknown.

(Continued)

*Primary Examiner*—Tim Heitbrink
(74) *Attorney, Agent, or Firm*—Medler Ferro PLLC

(57) ABSTRACT

An actuator for a hot runner has a piston and a valve pin holder threadably connected to the piston. The piston can be translated by fluid pressure and rotated by an electric motor. The valve pin holder is rotationally fixed, and therefore moves along the thread when the piston is rotated. A valve pin connected to the valve pin holder moves in response to fluid pressure and also in response to the electric motor rotating the piston.

26 Claims, 12 Drawing Sheets

FOREIGN PATENT DOCUMENTS

| | | |
|---|---|---|
| JP | 6-114887 A | 4/1994 |
| JP | 2001-225361 A1 | 8/2001 |
| KR | 96-000163 Y | 2/1996 |
| KR | 2006-0084865 A | 7/2006 |
| WO | WO-00/35655 | 6/2000 |
| WO | WO-2005-046953 A2 | 5/2005 |
| WO | WO-2006/080807 A1 | 8/2006 |

OTHER PUBLICATIONS

Extended EP Search Report for EP Appl. No. 08002955.6-1253, Jul. 15, 2008.

* cited by examiner

HOT RUNNER ACTUATOR

CROSS-REFERENCE TO RELATED APPLICATION

This application claims the benefit of U.S. provisional patent application No. 60/891,009 filed Feb. 21, 2007, which is hereby incorporated by reference in its entirety herein.

BACKGROUND OF THE INVENTION

1. Field of the Invention

The present invention relates generally to an injection molding apparatus, and more particularly to an actuator for controlling flow of molding material in a hot runner.

2. Related Art

A typical injection molding apparatus includes a runner that delivers heated molding material (melt) from a plasticizing screw to one or more mold cavities. The runner is typically an enclosed channel defined by a manifold and one or more nozzles. When the runner is heated, so as to prevent melt from freezing within the runner, it is called a hot runner.

Actuators are used with hot runners to control the flow of heated molding material. Such actuators are commonly hydraulic, pneumatic, or electric, each of which having advantages and drawbacks. Regardless of the type of actuator, the operation principle is the same, namely, to convert pressure or electricity to movement of valve pins or other flow controlling devices.

Hydraulic actuators are common, and these tend to deliver high force for their size. They also require hydraulic fluid or oil to operate, and leaks can result in contamination of equipment or environment.

Pneumatic actuators are common as well, and are cleaner in operation than hydraulic actuators. However, the compressibility of air lends itself to problems in this kind of actuator.

Electric actuators are increasingly common in hot runner applications. They are clean and can be highly accurate. However, for the same force delivered, electric actuators tend to be bulky compared to hydraulic and pneumatic actuators.

SUMMARY OF THE INVENTION

According to one aspect of the invention, an actuator for a hot runner comprises an electric motor having a fixed part and a rotating part that is rotatable about an axis, a piston connected to the rotating part and able to rotate with the rotating part, a housing disposed around the piston, and a valve pin holder threadably connected to the piston for connecting to a valve pin. The fixed part of the electric motor is fixed to the housing. The threaded connection of the piston and the valve pin holder is aligned with the axis. The housing and piston together define a fluid chamber, and the piston is slidable along the axis in response to fluid pressure applied to the fluid chamber. The valve pin holder is rotationally fixed with respect to the housing, and free to move along the axis when the piston rotates.

According to another aspect of the invention, an actuator for a hot runner comprises a housing, a piston, a valve pin holder, a fixed electric motor part, and a rotating electric motor part. The housing has an internal cavity and a fluid port. The piston is disposed within the cavity and defines with the housing a fluid chamber in communication with the fluid port. The piston is slidable along an axis and within the cavity in response to fluid pressure applied to the fluid port. The piston has a thread aligned with the axis, and the valve pin holder has a thread engaged with the thread of the piston. The valve pin holder is rotationally fixed with respect to the housing. The fixed electric motor part is fixed to the housing. The rotating electric motor part is electromagnetically coupled to the fixed electric motor part and connected to the piston, and has a center of rotation aligned with the axis. The rotating electric motor part and the piston rotate in response to energizing of one or more of the fixed electric motor part and the rotating electric motor part. The piston sliding within the cavity moves the valve pin holder and a connected valve pin. Rotation of the piston moves the valve pin holder along the thread of the piston and thereby moves the valve pin.

According to another aspect of the invention, a coinjection molding system comprises a nozzle, an actuator, a first flow control device, and a second flow control device. The nozzle has a first melt channel and a second melt channel. The actuator has a housing, a piston, an electric motor, and a valve pin holder threaded to the piston and rotationally fixed with respect to the housing. The electric motor is able to rotate the piston and thereby translate the valve pin holder. The piston is able to translate in response to fluid pressure. A first flow control device is connected to the piston for controlling flow of a first molding material through the first melt channel. The second flow control device is connected to the valve pin holder for controlling flow of a second molding material through the second melt channel.

According to another aspect of the invention, a sequential injection molding system comprises a nozzle, an actuator, a valve pin, a sensor, and a controller. The nozzle has a melt channel. The actuator has a housing, a piston, an electric motor, and a valve pin holder threaded to the piston and rotationally fixed with respect to the housing. The electric motor is able to rotate the piston and thereby translate the valve pin holder. The piston is able to translate in response to fluid pressure. The valve pin is connected to the valve pin holder, and is for controlling flow of molding material through the melt channel. The sensor is disposed in a mold cavity in communication with the melt channel. The controller is connected to the sensor and to the electric motor of the actuator. The controller is for controlling rotation of the piston according to measurement of the sensor.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
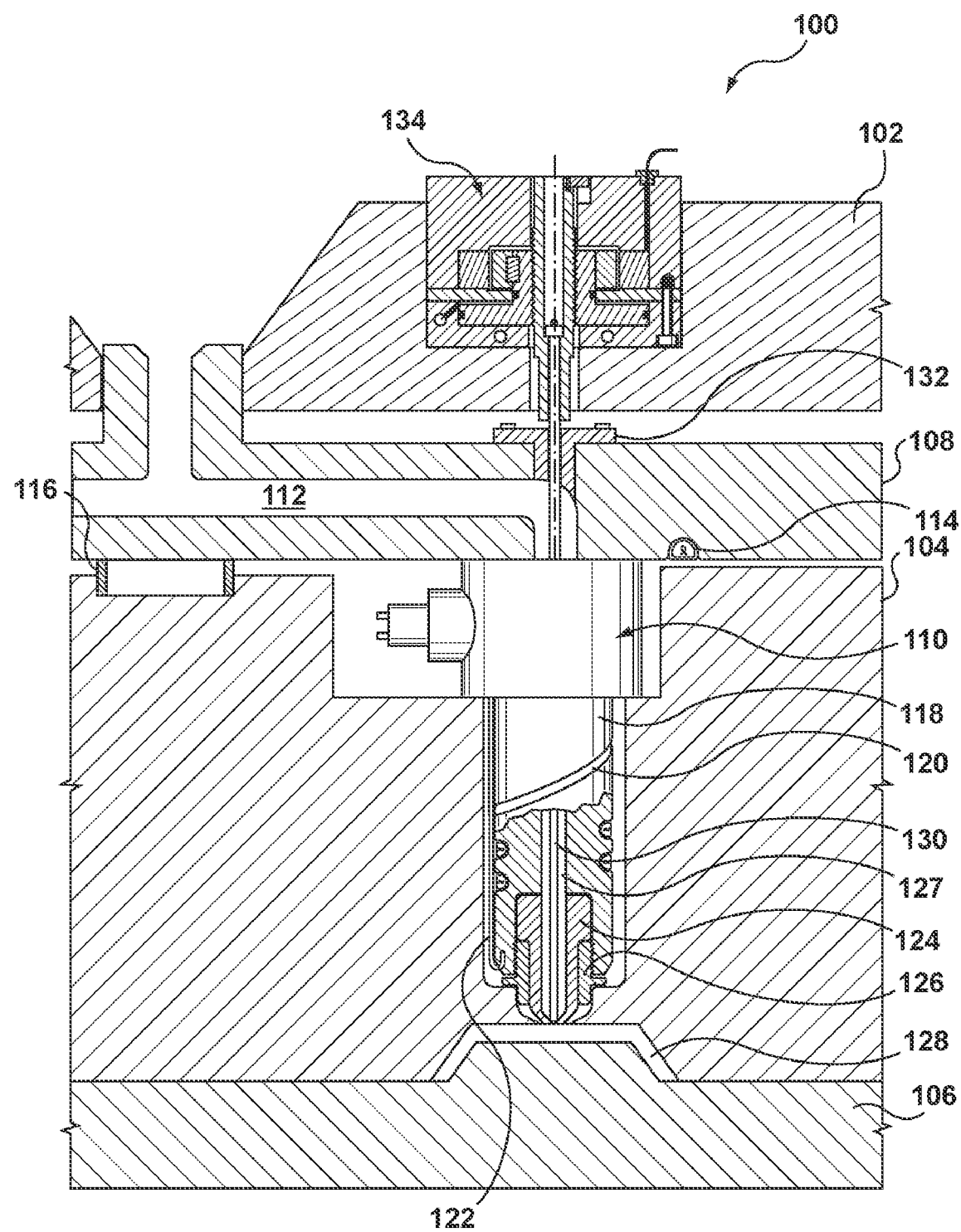
FIG. 1 is a partial sectional view of an injection molding system according to an embodiment of the invention.

FIG. 1 shows an injection molding system 100 according to an embodiment of the invention. In the description of this embodiment, like reference numerals in the 100 series are used to describe like parts for ease of understanding. The features and aspects described for the other embodiments can be used accordingly with the present embodiment.

The injection molding system 100 includes a back plate 102 and mold plates 104, 106. A mold cavity 128, in which a molded product is formed from solidified molding material (melt), is defined between the mold plates 104, 106. The mold plate 106 typically retracts to eject the molded part from the mold cavity 128.

A manifold 108 is disposed between the back plate 102 and the mold plate 104. The manifold 108 has a manifold melt channel 112 and a manifold heater 114, such as an electrical resistance heater in the form of an insulated heater wire. The manifold 108 is offset from the mold plate 104 by a locating ring 116.

A nozzle 110 is connected to the manifold 108 and extends into a well formed in the mold plate 104. The nozzle 110 includes a nozzle body 118, which has a nozzle heater 120 embedded therein. The nozzle heater 120 can be an electrical resistance heater in the form of an insulated heater wire. A temperature sensor 122, such as a thermocouple, is provided in the nozzle body 118. The nozzle 110 has a nozzle tip 124 held to the nozzle body 118 by a tip retainer 126. A nozzle melt channel 127 runs through the nozzle body 118, communicating the manifold melt channel 112 to the mold cavity 128. The combination of heated manifold 108 and heated nozzle 118 is known as a hot runner. It is common for hot runners to have more than one nozzle to feed molding material to one or more mold cavities.

A valve pin 130 extends from the back plate 102 to the mold cavity 128 through a valve pin bushing 132 connected to the manifold 108. The top of the valve pin 130 is connected to an actuator 134 located in the back plate 102. The actuator 134 moves the valve pin 130 up and down to control flow of molding material from the nozzle melt channel 127 to the mold cavity 128. In FIG. 1, the valve pin 130 is shown to open and close a mold gate; however, the valve pin 130 can also be designed to control any other part of the flow path of molding material.

Figure 2:
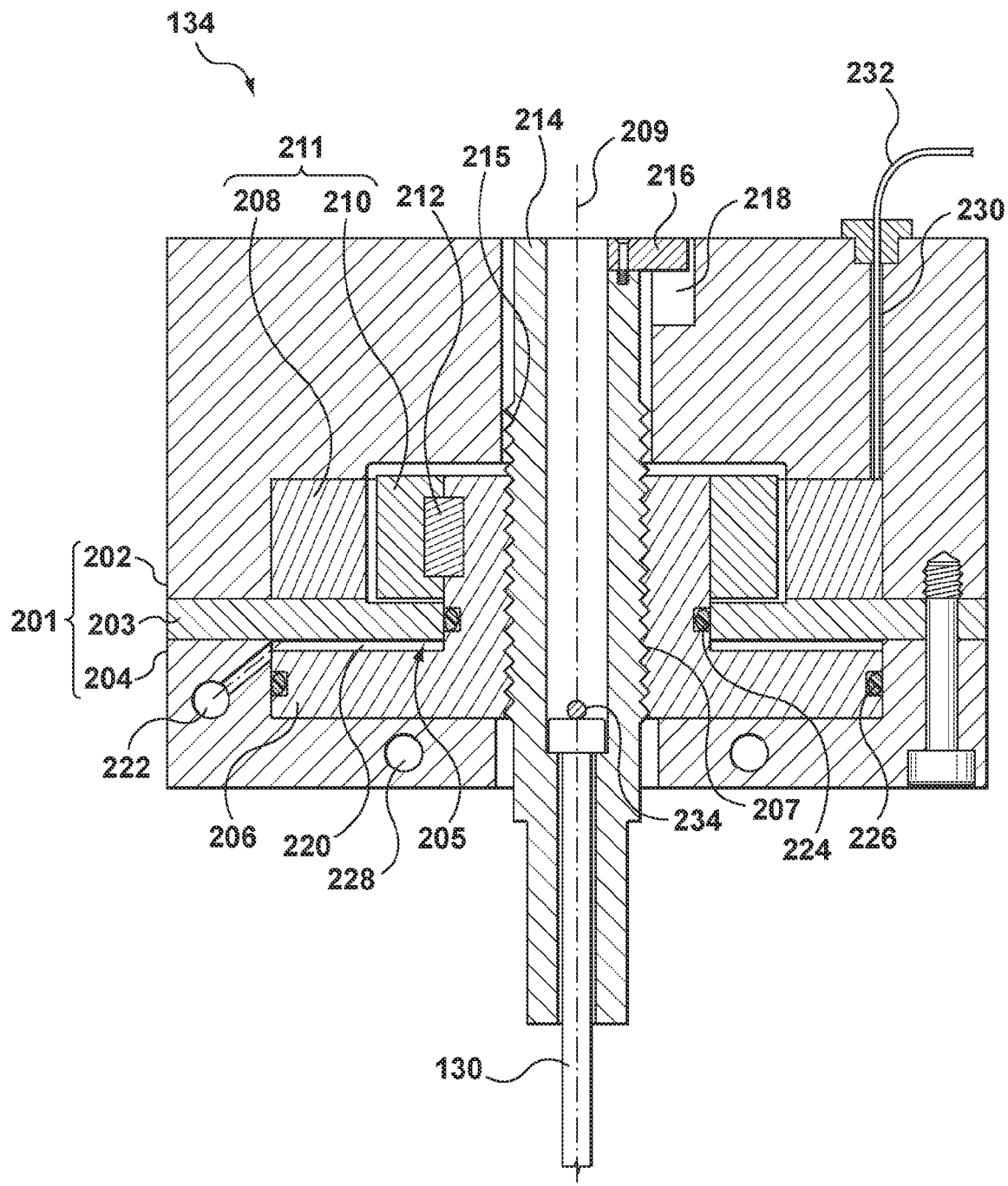
FIG. 2 is a sectional view of an actuator according to an embodiment of the invention.

FIG. 2 shows an embodiment of the actuator 134. In the description of this embodiment, like reference numerals in the 200 series are used to describe like parts for ease of understanding. The features and aspects described for the other embodiments can be used accordingly with the present embodiment.

The actuator 134 has a housing 201 comprising an upper housing part 202, a middle housing part 203, and a lower housing part 204, which are fastened together, by way of bolts, for example. More or fewer housing parts can be used, as determined by practical considerations such as cost, machining time, ease of assembly, and maintenance requirements. The housing 201 defines an internal cavity 205 in which other components of the actuator 134 are disposed.

A piston 206 is disposed in the cavity 205. The piston 206 has an upper portion and a wider lower portion, and is shaped to define a fluid chamber 220 in conjunction with the middle housing part 203 and the lower housing part 204. The fluid chamber 220 is connected to a fluid port 222 of the lower housing part 204, the fluid port 222 being connectable to a source of fluid, such as air or other gas, hydraulic fluid, or the like. The piston 206 has a central threaded bore 207 aligned with a central axis 209. Piston seals 224, 226, such as o-rings, are provided on the outside of the piston 206. The piston seals 224, 226 contact the housing 201 and serve to isolate the fluid chamber 220.

A fixed electric motor part 208 is connected to the upper housing part 202, and can be fixed in place by a friction or interference fit, bolts, or other known means. A rotating electric motor part 210 is connected to the piston 206 by way of a locking piece 212, although a friction or interference fit, bolts, or similar could also be used. The fixed electric motor part 208 is connected to an external power source by wires 232 that run through a conduit 230 of the upper housing part 202. The fixed electric motor part 208 and the rotating electric motor part 210 are electromagnetically coupled together such that they form an electric motor 211, which can be a torque motor, a stepper motor, an induction motor, or the like. As such, the fixed electric motor part 208 and the rotating electric motor part 210 can comprise components such as wire coils, electromagnets, permanent magnets, etc. Depending on the type of motor, the wires 232 may also be used to deliver control signals to the fixed electric motor part 208. When power (and, if required, a control signal) is provided via the wires 232 to the fixed electric motor part 208, the fixed electric motor part 208 becomes energized and causes the rotating electric motor part 210 and the attached piston 206 to rotate. The direction of rotation depends on the polarity of the power provided or on a control signal. In other embodiments, the rotating electric motor part 210 may be energized in addition to the fixed electric motor part 208 or instead of the fixed electric motor part 208.

A valve pin holder 214 is threadably connected to the piston 206 by way of a thread 215 that mates with the threaded bore 207 of the piston 206. The valve pin holder 214 is rotationally fixed with respect to the housing 201 by way of a key 216 engaged with a slot 218 of the upper housing part 202. Attached to the bottom of the valve pin holder 214 is the valve pin 130, which can be held in place, for example, by a valve pin securing dowel 234 inserted into an opening of the valve pin holder 214. The valve pin 130 extends along the axis 209, though in other embodiments the valve pin 130 could extend in other directions. A cooling channel 228 is provided in the lower housing part 204 near where the valve pin holder 214 and connected valve pin 130 extend through the lower housing part 204, so as to reduce any effect on the actuator 134 of heating of the valve pin 130 by the molding material. When the piston 206 is rotated, the threaded connection and anti-rotation key 216 and slot 218 combination cause the valve pin holder 214 and thus the valve pin 130 to translate with respect to the housing 201 along the axis 209. The direction of translation is determined by the direction of rotation. The length of the slot 218 can be sized to govern an extent of movement of the valve pin holder 214. Other or different limits, mechanical or electrical, on extents of movement of the valve pin holder 214 and the attached valve pin 130 can also be provided.

In operation, the actuator 134 can be considered to have two independent modes of actuation: a pressure mode and an electric mode. In the pressure mode, when fluid pressure (e.g., pneumatic or hydraulic pressure) is applied to the fluid port 222 and thus to the fluid chamber 220, the piston 206 is forced downwards, thereby moving the thread-connected valve pin holder 214 and the attached valve pin 130 downwards. When fluid pressure is released, the piston 206 is free to "float," the position of the valve pin 130 being allowed to change in response to other forces. Also, if desired, negative fluid pressure (e.g., partial vacuum) can be applied to the fluid port 222, thereby pulling upwards the piston 206 and the attached valve pin holder 214 and valve pin 130. In the electric mode of actuation, when the fixed electric motor part 208 is energized, the rotating electric motor part 210 and the attached piston 206 rotate, thereby causing the threaded connection to translate the valve pin holder 214 and the attached valve pin 130. The valve pin 130 can be moved upwards or downwards depending on the direction that the rotating electric motor part 210 is rotated. Generally, the pressure mode controls the position of the piston 206 with respect to the housing 201, while the electric mode controls the position of the valve pin holder 214 with respect to the piston 206.

Figure 3A:
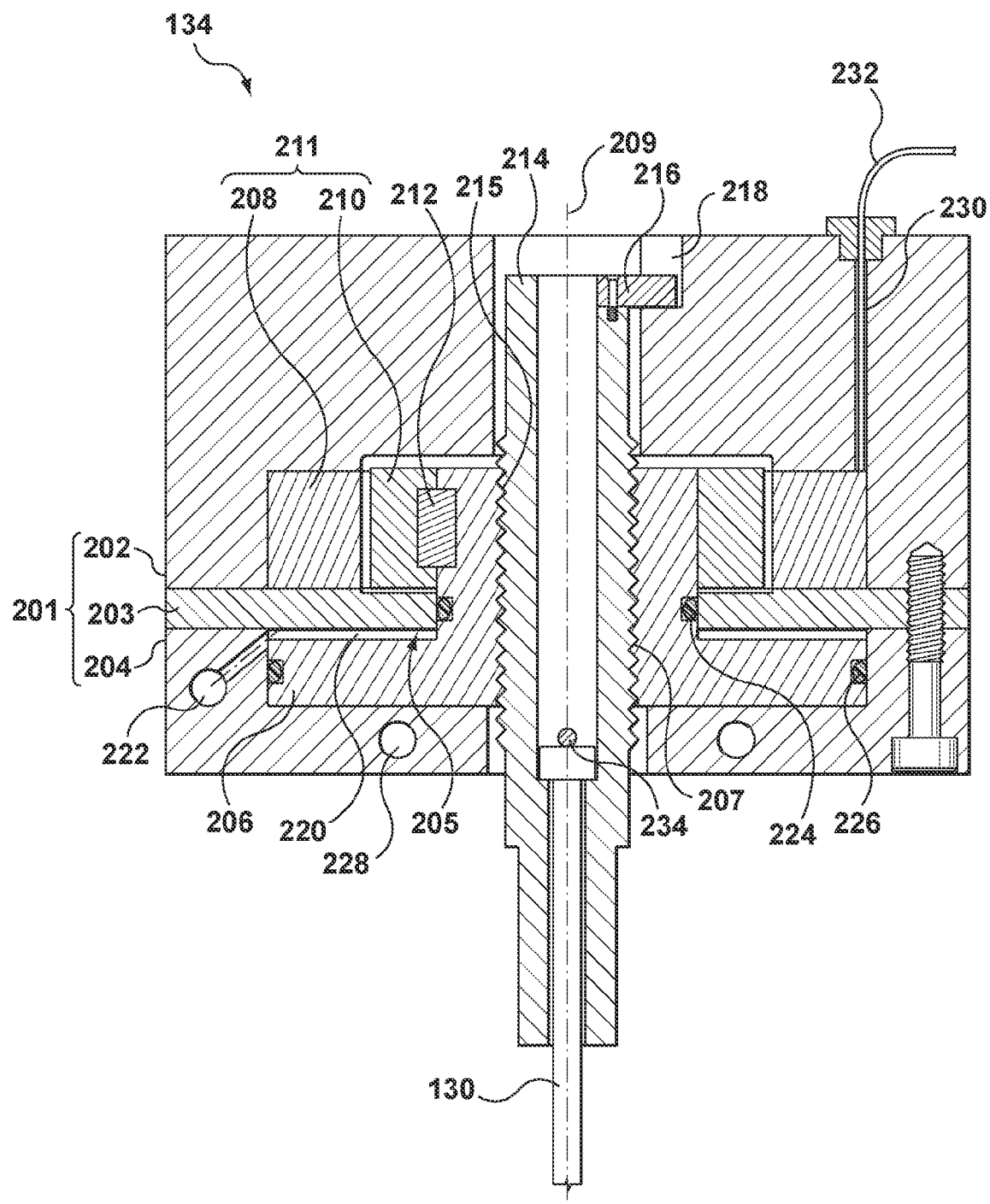
FIGS. 3a-3c are sectional views of the actuator of FIG. 2 in various states.
Figure 3B:
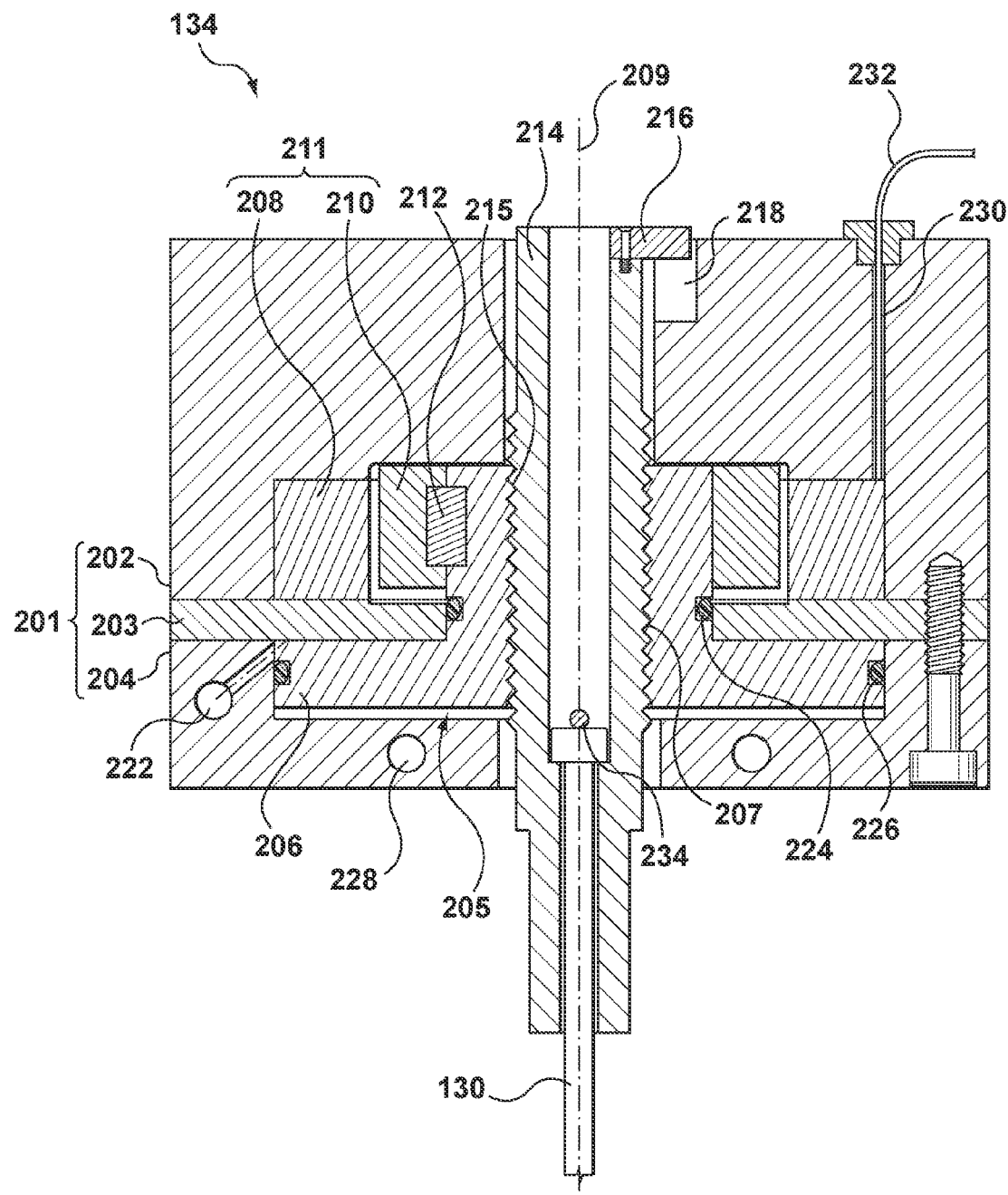
Figure 3C:
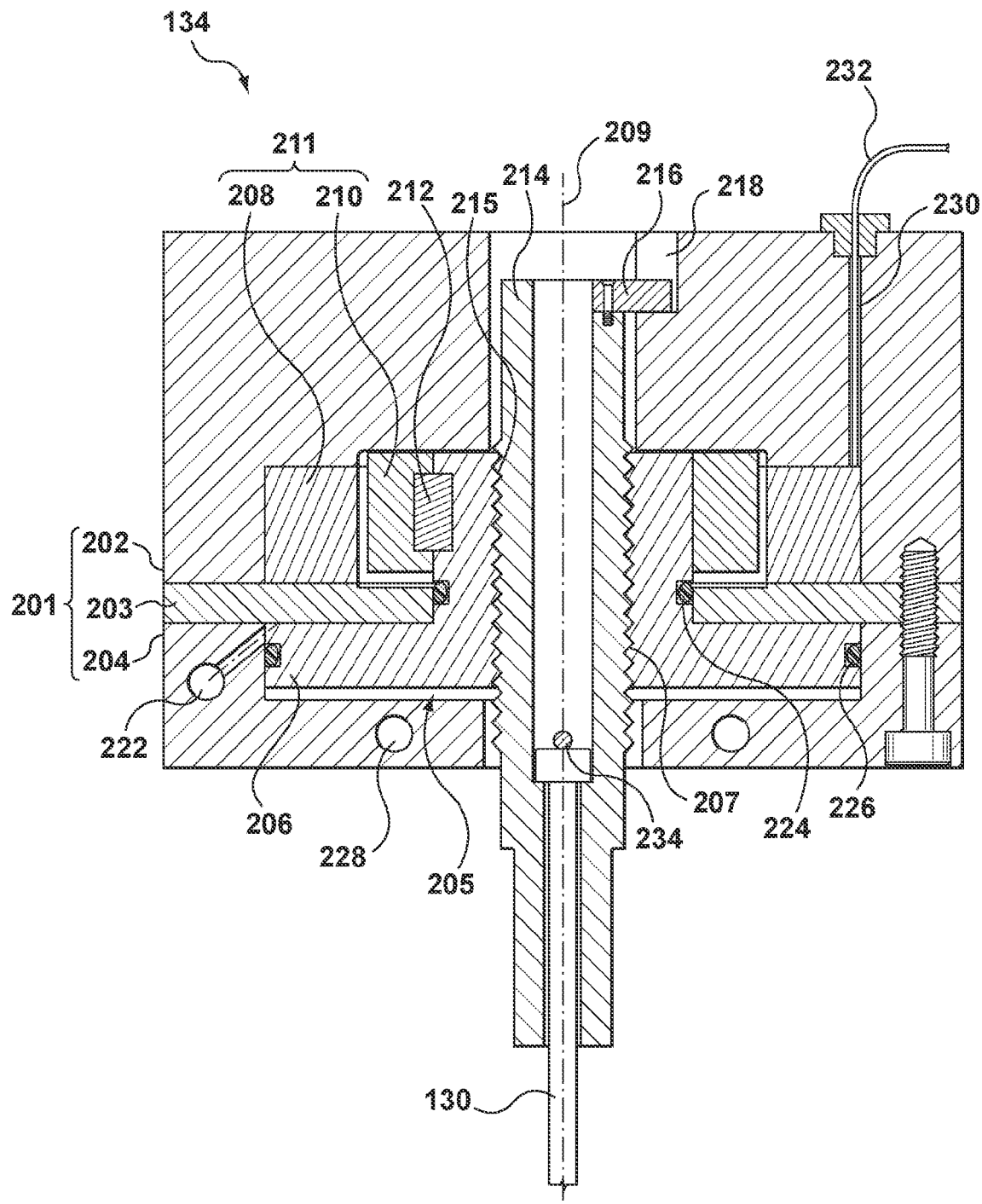

FIGS. 3a-c show various states of the actuator 134. FIG. 3a shows a state in which the piston 206 and the valve pin holder 214 are both down, and this state is suitable for the valve pin 130 to close a mold gate, for example. FIG. 3b shows a state in which the piston 206 and the valve pin holder 214 are both up, this state being suitable for the valve pin 130 to fully open the mold gate, for example. FIG. 3c shows a state in which the piston 206 is up and the valve pin holder 214 is down, which puts the valve pin 130 in an intermediate state to those shown in FIGS. 3a and 3b. The state of FIG. 3c may occur just before fluid pressure is applied to the fluid port 222 to move the piston 206 downwards to close the mold gate with the valve pin 130 against high pressure. Other states of the actuator 134 are also possible, with those described above simply being examples.

Figure 4A:
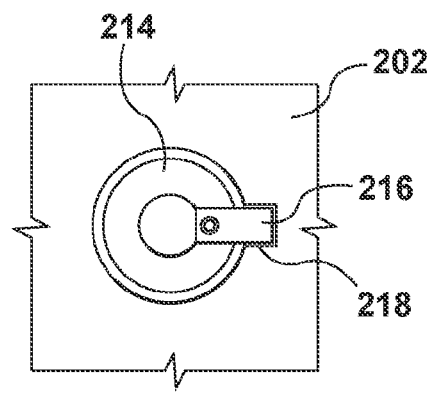
FIGS. 4a-c are views of anti-rotation arrangements for preventing the valve pin holder from rotating with respect to the housing.
Figure 4B:
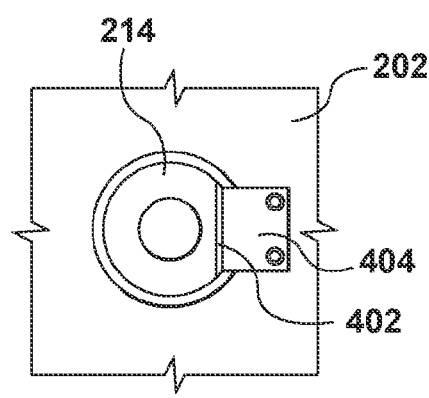
Figure 4C:
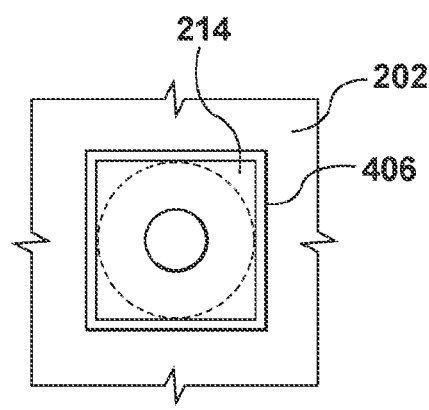

FIGS. 4a-c show anti-rotation arrangements for preventing the valve pin holder 214 from rotating with respect to the housing 201. FIG. 4a shows the key 216 and slot 218 arrangement described above. The key 216 can be detachable for ease of assembly or manufacture. The positions of the key 216 and slot 218 could be reversed, such that a key is fixed to the upper housing part 202 and a slot is provided in the valve pin holder 214. FIG. 4b shows an arrangement similar to the reversal of the arrangement of FIG. 4a. A portion of the valve pin holder 214 is provided with a flat surface 402. A key 404 is attached to the upper housing part 202, and contacts the flat surface 402 to prevent rotation of the valve pin holder 214. The flat surface 402 is long enough to allow for the desired range of movement (into the page) of the valve pin holder 214. In the arrangement shown in FIG. 4c, the valve pin holder 214 has a rectangular portion that fits within a rectangular opening 406 of the upper housing part 202. In this arrangement, any non-circular shape will work. In all the arrangements, the anti-rotation parts (e.g., pin and slot) can be located anywhere along the length of the valve pin holder 214.

Figure 5:
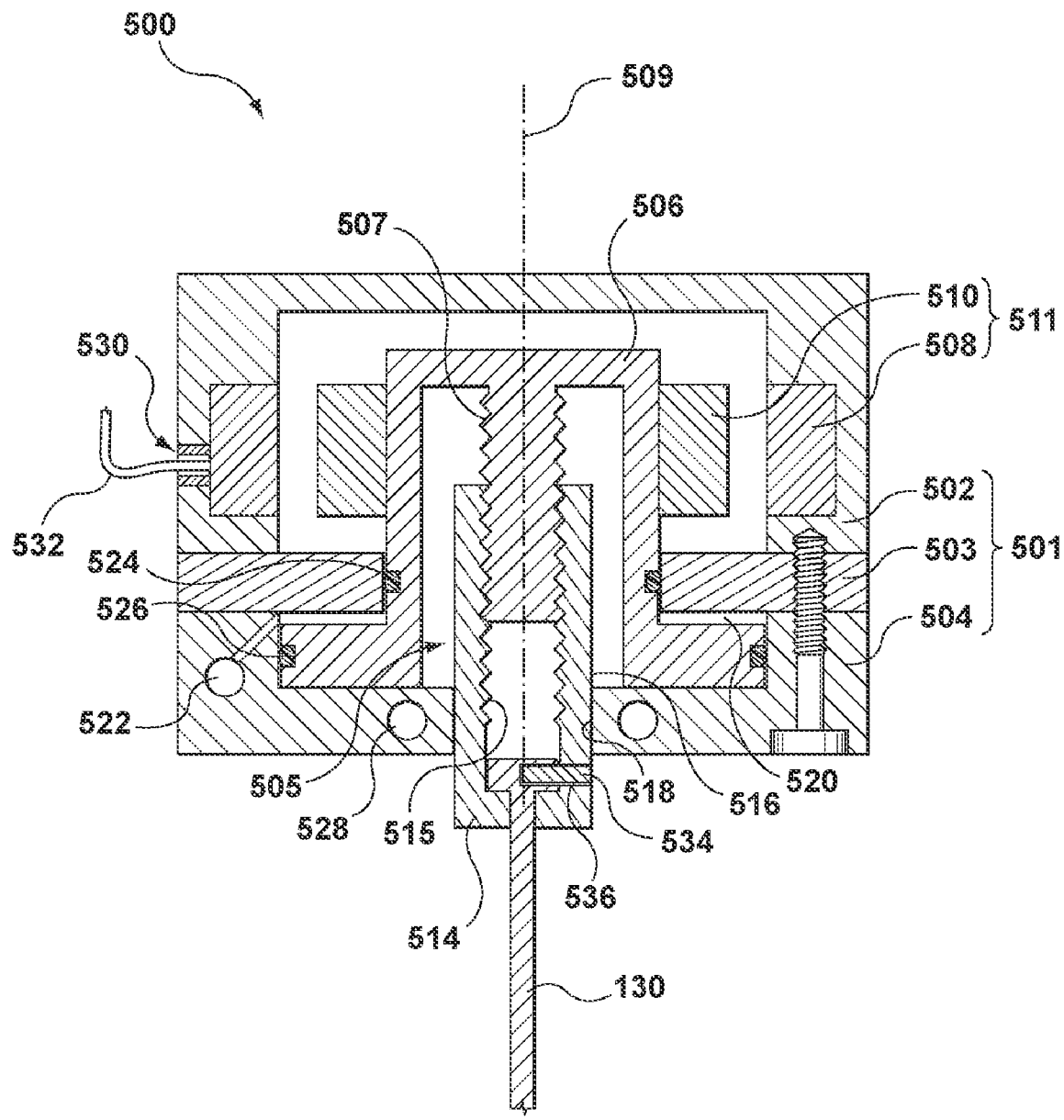
FIG. 5 is a sectional view of an actuator according to another embodiment of the invention.

FIG. 5 shows an actuator 500 according to another embodiment of the invention. In the description of this embodiment, like reference numerals in the 500 series are used to describe like parts for ease of understanding. The features and aspects described for the other embodiments can be used accordingly with the present embodiment. The actuator 500 is similar to the other embodiments described herein, one difference being the arrangement of the threaded connection.

The actuator 500 has a housing 501 comprising an upper housing part 502, a middle housing part 503, and a lower housing part 504, which are fastened together, by way of bolts, for example. More or fewer housing parts can be used, as determined by practical considerations such as cost, machining time, ease of assembly, and maintenance requirements. The housing 501 defines an internal cavity 505 in which other components of the actuator 500 are disposed.

A piston 506 is disposed in the cavity 505. The piston 506 has an upper portion and a wider lower portion, and is shaped to define a fluid chamber 520 in conjunction with the middle housing part 503 and the lower housing part 504. The fluid chamber 520 is connected to a fluid port 522 of the lower housing part 504, the fluid port 522 being connectable to a source of fluid, such as air or other gas, hydraulic fluid, or the like. The piston 506 is mainly hollow and has an internal central threaded rod 507 aligned with a central axis 509. Piston seals 524, 526, such as o-rings, are provided on the outside of the piston 506. The piston seals 524, 526 contact the housing 501 and serve to isolate the fluid chamber 520.

A fixed electric motor part 508 is connected to the upper housing part 502, and can be fixed in place by a friction or interference fit, bolts, or other known means. A rotating electric motor part 510 is connected to the piston 506 by way of a friction or interference fit, although bolts, a locking piece, or similar structure could also be used. The fixed electric motor part 508 is connected to an external power source by wires 532 that run through a conduit 530 of the upper housing part 502. The fixed electric motor part 508 and the rotating electric motor part 510 are electromagnetically coupled together such that they form an electric motor 511, which can be a torque motor, a stepper motor, an induction motor, or the like. As such, the fixed electric motor part 508 and the rotating electric motor part 510 can comprise components such as wire coils, electromagnets, permanent magnets, etc. Depending on the type of motor, the wires 532 may also be used to deliver control signals to the fixed electric motor part 508. When power (and, if required, a control signal) is provided via the wires 532 to the fixed electric motor part 508, the fixed electric motor part 508 becomes energized and causes the rotating electric motor part 510 and the attached piston 506 to rotate. The direction of rotation depends on the polarity of the power provided or on a control signal. In other embodiments, the rotating electric motor part 510 may be energized in addition to the fixed electric motor part 508 or instead of the fixed electric motor part 508.

A valve pin holder 514 is threadably connected to the piston 506 by way of an internal thread 515 that mates with the threaded rod 507 of the piston 506. The valve pin holder 514 has a non-circular external cross-section 516 (e.g., see FIG. 4c) where it extends through a like-shaped opening 518 in the lower housing part 504, and thus the valve pin holder 514 is rotationally fixed with respect to the housing 501. Attached to the bottom of the valve pin holder 514 is the valve pin 130, which can be held in place, for example, by a valve pin securing dowel 534 inserted into an opening 536 in the side of the valve pin holder 514. The valve pin 130 extends along the axis 509, though in other embodiments the valve pin 130 could extend in other directions. A cooling channel 528 is provided in the lower housing part 504 near the opening 518 through which the valve pin holder 514 and connected valve pin 130 extend, so as to reduce any effect on the actuator 500 of heating of the valve pin 130 by the molding material. When the piston 506 is rotated, the threaded connection and the anti-rotation effect of the non-circular external cross-section 516 and the opening 518 cause the valve pin holder 514 and thus the valve pin 130 to translate with respect to the housing 501 along the axis 509. The direction of translation is determined by the direction of rotation. The upward movement of the valve pin holder 514 with respect to the piston 506 can be stopped by the valve pin holder 514 abutting the inside of the piston 506. In addition, other mechanical or electrical limits on the extents of movement of the valve pin holder 514 and the attached valve pin 130 can be provided.

In operation, the actuator 500 can be considered to have two independent modes of actuation: a pressure mode and an electric mode. In the pressure mode, when fluid pressure (e.g., pneumatic or hydraulic pressure) is applied to the fluid port 522 and thus to the fluid chamber 520, the piston 506 is forced downwards, thereby moving the thread-connected valve pin holder 514 and the attached valve pin 130 downwards. When fluid pressure is released, the piston 506 is free to "float," the position of the valve pin 130 being allowed to change in response to other forces. Also, if desired, negative fluid pressure (e.g., partial vacuum) can be applied to the fluid port 522, thereby pulling upwards the piston 506 and the attached valve pin holder 514 and valve pin 130. In the electric mode of actuation, when the fixed electric motor part 508 is energized, the rotating electric motor part 510 and the attached piston 506 rotate, thereby causing the threaded connection to translate the valve pin holder 514 and the attached valve pin 130. The valve pin 130 can be moved upwards or downwards depending on the direction that the rotating electric motor part 510 is rotated. Generally, the pressure mode controls the position of the piston 506 with respect to the housing 501, while the electric mode controls the position of the valve pin holder 514 with respect to the piston 506.

Figure 6:
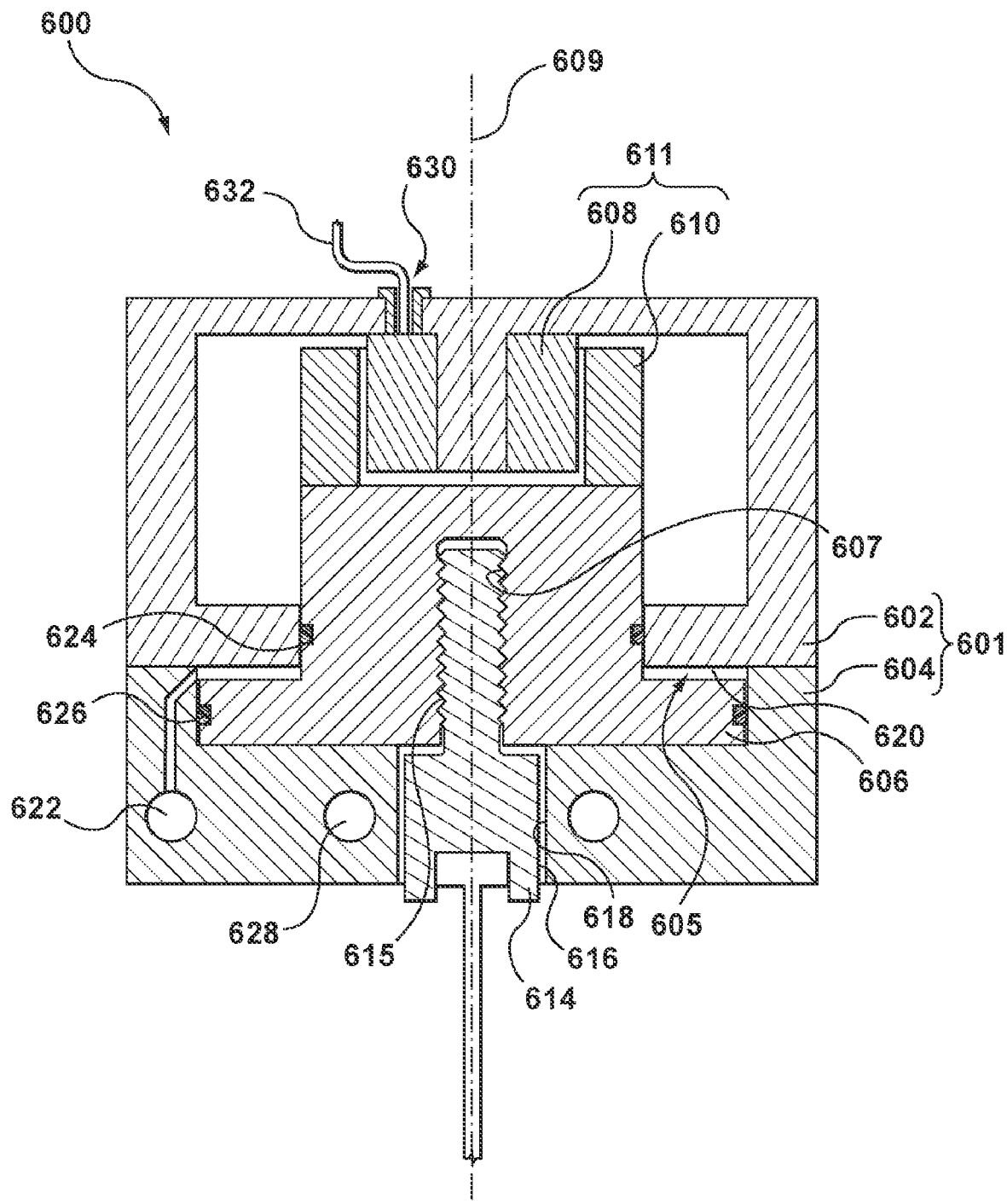
FIG. 6 is a sectional view of an actuator according to another embodiment of the invention.

FIG. 6 shows an actuator 600 according to another embodiment of the invention. In the description of this embodiment, like reference numerals in the 600 series are used to describe like parts for ease of understanding. The features and aspects described for the other embodiments can be used accordingly with the present embodiment. The actuator 600 is similar to the other embodiments described herein, one difference being the arrangement of the electric motor parts.

The actuator 600 has a housing 601 comprising an upper housing part 602 and a lower housing part 604, which are fastened together, by way of bolts, for example. More or fewer housing parts can be used, as determined by practical considerations such as cost, machining time, ease of assembly, and maintenance requirements. The housing 601 defines an internal cavity 605 in which other components of the actuator 600 are disposed.

A piston 606 is disposed in the cavity 605. The piston 606 has an upper portion and a wider lower portion, and is shaped to define a fluid chamber 620 in conjunction with the upper housing part 602 and the lower housing part 604. The fluid chamber 620 is connected to a fluid port 622 of the lower housing part 604, the fluid port 622 being connectable to a source of fluid, such as air or other gas, hydraulic fluid, or the like. The piston 606 has a central threaded bore 607 aligned with a central axis 609. In this embodiment, the central threaded bore 607 is blind. Piston seals 624, 626, such as o-rings, are provided on the outside of the piston 606. The piston seals 624, 626 contact the housing 601 and serve to isolate the fluid chamber 620.

A fixed electric motor part 608 is connected to the top part of the upper housing part 602, and can be fixed in place by a friction or interference fit, bolts, or other known means. A rotating electric motor part 610 is connected to the piston 606 in a similar manner. In this embodiment, the rotating electric motor part 610 surrounds the fixed electric motor part 608. The fixed electric motor part 608 is connected to an external power source by wires 632 that run through a conduit 630 of the upper housing part 602. The fixed electric motor part 608 and the rotating electric motor part 610 are electromagnetically coupled together such that they form an electric motor 611, which can be a torque motor, a stepper motor, an induction motor, or the like. As such, the fixed electric motor part 608 and the rotating electric motor part 610 can comprise components such as wire coils, electromagnets, permanent magnets, etc. Depending on the type of motor, the wires 632 may also be used to deliver control signals to the fixed electric motor part 608. When power (and, if required, a control signal) is provided via the wires 632 to the fixed electric motor part 608, the fixed electric motor part 608 becomes energized and causes the rotating electric motor part 610 and the attached piston 606 to rotate. The direction of rotation depends on the polarity of the power provided or on a control signal. In other embodiments, the rotating electric motor part 610 may be energized in addition to the fixed electric motor part 608 or instead of the fixed electric motor part 608.

A valve pin holder 614 is threadably connected to the piston 606 by way of a thread 615 that mates with the threaded bore 607 of the piston 606. The valve pin holder 614 has a non-circular external cross-section 616 (e.g., see FIG. 4c) where it extends through a like-shaped opening 618 in the lower housing part 604, and thus the valve pin holder 614 is rotationally fixed with respect to the housing 601. Attached to the bottom of the valve pin holder 614 is the valve pin 130, which can be held in place, for example, by press fitting or thermal joining (e.g., brazing or welding). The valve pin 130 extends along the axis 609, although in other embodiments the valve pin 130 could extend in other directions. A cooling channel 628 is provided in the lower housing part 604 near where the valve pin holder 614 and connected valve pin 130 extend through the lower housing part 604, so as to reduce any effect on the actuator 600 of heating of the valve pin 130 by the molding material. When the piston 606 is rotated, the threaded connection and the anti-rotation effect of the non-circular external cross-section 616 and the opening 618 cause the valve pin holder 614 and thus the valve pin 130 to translate with respect to the housing 601 along the axis 609. The direction of translation is determined by the direction of rotation. The upward movement of the valve pin holder 614 with respect to the piston 606 can be stopped by the valve pin holder 614 abutting the bottom of the piston 606. In addition, other mechanical or electrical limits on the extents of movement of the valve pin holder 614 and the attached valve pin 130 can be provided.

In operation, the actuator 600 can be considered to have two independent modes of actuation: a pressure mode and an electric mode. In the pressure mode, when fluid pressure (e.g., pneumatic or hydraulic pressure) is applied to the fluid port 622 and thus to the fluid chamber 620, the piston 606 is forced downwards, thereby moving the thread-connected valve pin holder 614 and the attached valve pin 130 downwards. When fluid pressure is released, the piston 606 is free to "float," the position of the valve pin 130 being allowed to change in response to other forces. Also, if desired, negative fluid pressure (e.g., partial vacuum) can be applied to the fluid port 622, thereby pulling upwards the piston 606 and the attached valve pin holder 614 and valve pin 130. In the electric mode of actuation, when the fixed electric motor part 608 is energized, the rotating electric motor part 610 and the attached piston 606 rotate, thereby causing the threaded connection to translate the valve pin holder 614 and the attached valve pin 130. The valve pin 130 can be moved upwards or downwards depending on the direction that the rotating electric motor part 610 is rotated. Generally, the pressure mode controls the position of the piston 606 with respect to the housing 601, while the electric mode controls the position of the valve pin holder 614 with respect to the piston 606.

Figure 7:
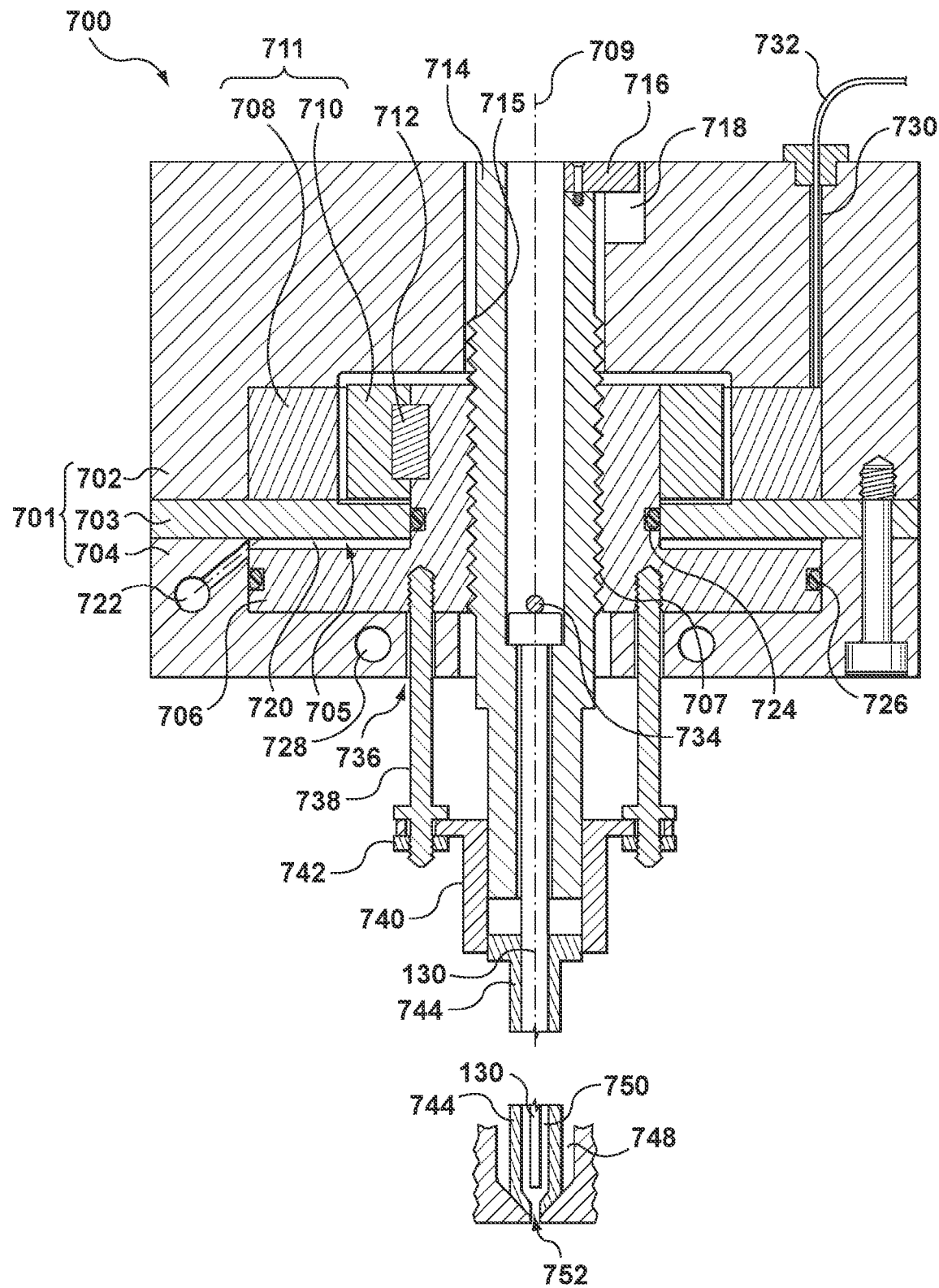
FIG. 7 is a sectional view of a coinjection actuator according to an embodiment of the invention.

FIG. 7 shows an actuator 700 according to another embodiment of the invention, the actuator 700 being particularly suitable for coinjection molding. In the description of this embodiment, like reference numerals in the 700 series are used to describe like parts for ease of understanding. The features and aspects described for the other embodiments can be used accordingly with the present embodiment.

The actuator 700 has a housing 701 comprising an upper housing part 702, a middle housing part 703, and a lower housing part 704, which are fastened together, by way of bolts, for example. More or fewer housing parts can be used, as determined by practical considerations such as cost, machining time, ease of assembly, and maintenance requirements. The housing 701 defines an internal cavity 705 in which other components of the actuator 700 are disposed.

A piston 706 is disposed in the cavity 705. The piston 706 has an upper portion and a wider lower portion, and is shaped to define a fluid chamber 720 in conjunction with the middle housing part 703 and the lower housing part 704. The fluid chamber 720 is connected to a fluid port 722 of the lower housing part 704, the fluid port 722 being connectable to a source of fluid, such as air or other gas, hydraulic fluid, or the like. The piston 706 has a central threaded bore 707 aligned with a central axis 709. Piston seals 724, 726, such as o-rings, are provided on the outside of the piston 706. The piston seals 724, 726 contact the housing 701 and serve to isolate the fluid chamber 720.

A fixed electric motor part 708 is connected to the upper housing part 702, and can be fixed in place by a friction or interference fit, bolts, or other known means. A rotating electric motor part 710 is connected to the piston 706 by way of a locking piece 712, although a friction or interference fit, bolts, or similar could also be used. The fixed electric motor part 708 is connected to an external power source by wires 732 that run through a conduit 730 of the upper housing part 702. The fixed electric motor part 708 and the rotating electric motor part 710 are electromagnetically coupled together such that they form an electric motor 711, which can be a torque motor, a stepper motor, an induction motor, or the like. As such, the fixed electric motor part 708 and the rotating electric motor part 710 can comprise components such as wire coils, electromagnets, permanent magnets, etc. Depending on the type of motor, the wires 732 may also be used to deliver control signals to the fixed electric motor part 708. When power (and, if required, a control signal) is provided via the wires 732 to the fixed electric motor part 708, the fixed electric motor part 708 becomes energized and causes the rotating electric motor part 710 and the attached piston 706 to rotate. The direction of rotation depends on the polarity of the power provided or on a control signal. In other embodiments, the rotating electric motor part 710 may be energized in addition to the fixed electric motor part 708 or instead of the fixed electric motor part 708.

A valve pin holder 714 is threadably connected to the piston 706 by way of a thread 715 that mates with the threaded bore 707 of the piston 706. The valve pin holder 714 is rotationally fixed with respect to the housing 701 by way of a key 716 engaged with a slot 718 of the upper housing part 702. Attached to the bottom of the valve pin holder 714 is the valve pin 130, which can be held in place, for example, by a valve pin securing dowel 734 inserted into an opening of the valve pin holder 714. The valve pin 130 extends along the axis 709, though in other embodiments the valve pin 130 could extend in other directions. A cooling channel 728 is provided in the lower housing part 704 near where the valve pin holder 714 and connected valve pin 130 extend through the lower housing part 704, so as to reduce any effect on the actuator 700 of heating of the valve pin 130 by the molding material. When the piston 706 is rotated, the threaded connection and anti-rotation key 716 and slot 718 combination cause the valve pin holder 714 and thus the valve pin 130 to translate with respect to the housing 701 along the axis 709. The direction of translation is determined by the direction of rotation. The length of the slot 718 can be sized to govern an extent of movement of the valve pin holder 714. Other or different limits, mechanical or electrical, on extents of movement of the valve pin holder 714 and the attached valve pin 130 can also be provided.

Threaded rods 738 extend from the piston 706 and through slots 736 in the lower housing part 704. The threaded rods 738 are fastened to a sleeve holder 740 by nuts 742, although other fastening means could equally be used. A sleeve 744 is attached to the sleeve holder 740, and extends along the axis 709 and surrounds the valve pin 130. Translation of the piston 706 moves the sleeve 744 to control flow of a first molding material in a first (outer) melt channel 748. However, since translation of the piston 706 also translates the valve pin holder 714, translation of the piston 706 does not control flow of a second molding material in a second (inner) melt channel 750. Rather, rotation of the piston 706 translates the valve pin holder 714, allowing the valve pin 130 to control flow of the second molding material through an opening in the sleeve 744. In this embodiment, both the first and second molding materials eventually flow through a mold gate 752. Thus, the actuator 700 controls independent flow of the first and second molding materials. Other coinjection designs, such as side-by-side pins, can also be used with the actuator 700, with pins and sleeves generally being referred to as flow control devices.

In operation, the actuator 700 can be considered to have two independent modes of actuation: a pressure mode and an electric mode. In the pressure mode, when fluid pressure (e.g., pneumatic or hydraulic pressure) is applied to the fluid port 722 and thus to the fluid chamber 720, the piston 706 is forced downwards, thereby moving the thread-connected valve pin holder 714 and attached valve pin 130 as well as the sleeve 744 downwards. When fluid pressure is released, the piston 706 is free to "float," the position of the valve pin 130 and sleeve 744 being allowed to change in response to other forces. Also, if desired, negative fluid pressure (e.g., partial vacuum) can be applied to the fluid port 722, thereby pulling upwards the piston 706 and the attached valve pin holder 714 and valve pin 130 as well as the sleeve 744. In the pressure mode, the valve pin 130 does not move relative to the sleeve 744. In the electric mode of actuation, when the fixed electric motor part 708 is energized, the rotating electric motor part 710 and the attached piston 706 rotate, thereby causing the threaded connection to translate the valve pin holder 714 and the attached valve pin 130. The valve pin 130 can be moved upwards or downwards depending on the direction that the rotating electric motor part 710 is rotated. In the electric mode, the valve pin 130 can be moved relative to the sleeve 744. Generally, the pressure mode controls the position of the piston 706 and attached sleeve 744 with respect to the housing 701, while the electric mode controls the position of the valve pin holder 714 with respect to the piston 706 and thus the position of the valve pin 130 with respect to the sleeve 744.

Figure 8A:
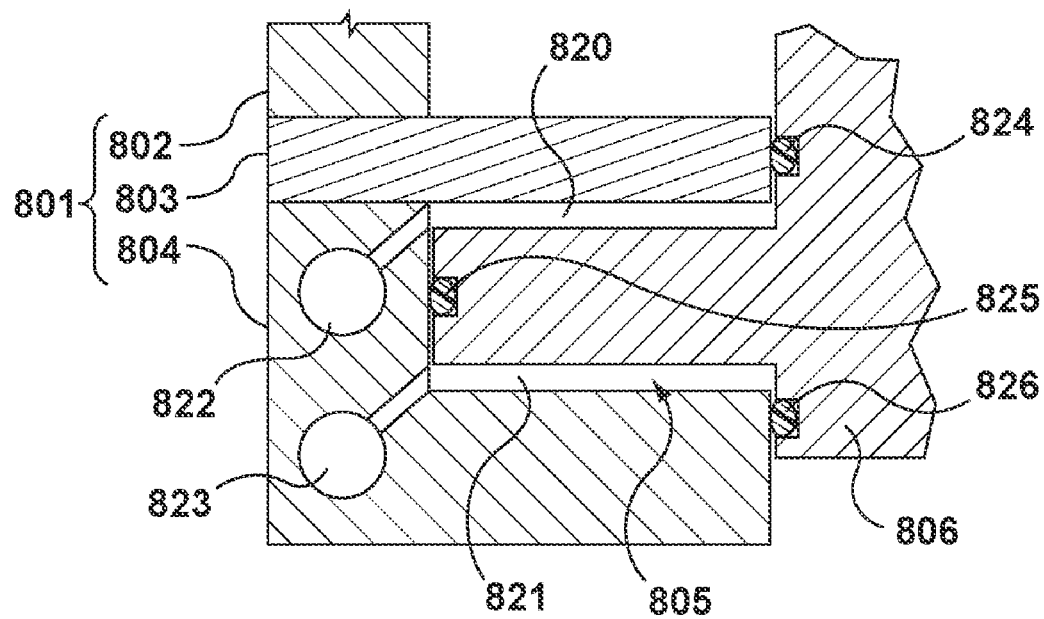
FIGS. 8a-b are sectional views of several piston arrangements for use with embodiments of the invention.
Figure 8B:
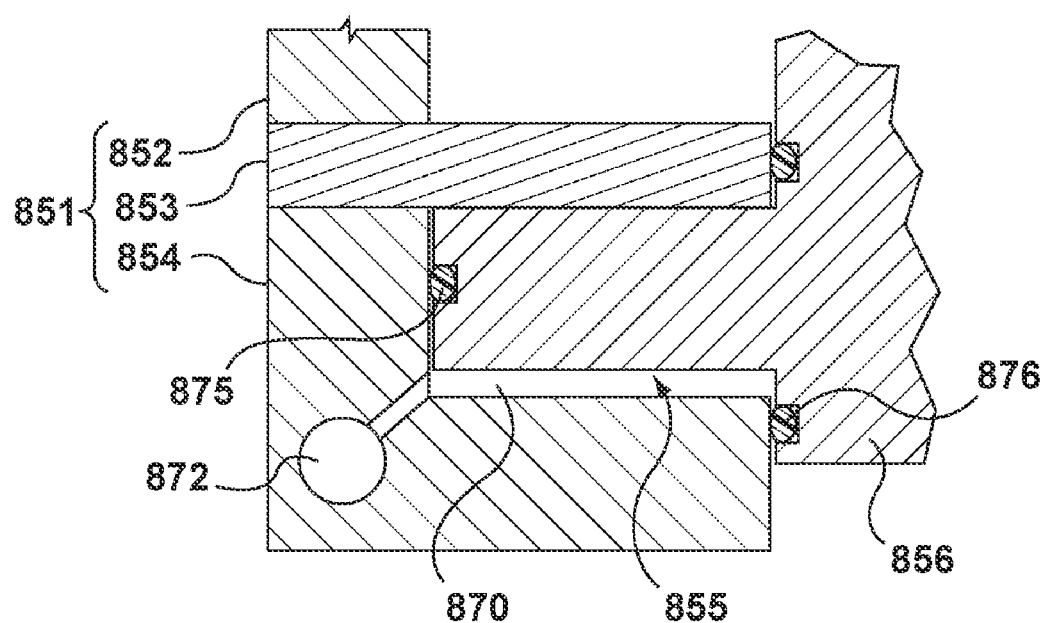

FIGS. 8a-b show several piston arrangements for use in the above embodiments. With reference to FIG. 8a, an actuator housing 801 includes an upper housing part 802, a middle housing part 803, and a lower housing part 804. The housing 801 defines an internal cavity 805, in which is disposed a piston 806. A fluid chamber 820 exists on one side of the piston 806, and another fluid chamber 821 exists on the other side of the piston 806. Fluid ports 822, 823 are provided in the lower housing part 804 to connect the fluid chambers 820, 821 to external sources of fluid, such as air or other gas, hydraulic fluid, or the like. Piston seals 824, 825, 826, such as o-rings, isolate the fluid chambers 820, 821 from each other and from other regions of the cavity 805. When fluid pressure (positive or negative) is applied to one or more of the fluid ports 822, 823, the piston 806 translates accordingly, moving with it any of the valve pin holders and/or sleeves described in the embodiments.

With reference to FIG. 8b, an actuator housing 851 includes an upper housing part 852, a middle housing part 853, and a lower housing part 854. The housing 851 defines an internal cavity 855, in which is disposed a piston 856. A fluid chamber 870 exists between the piston 856 and the lower housing part 854. A fluid port is 872 is provided in the lower housing part 854 to connect the fluid chamber 870 to an external source of fluid, such as air or other gas, hydraulic fluid, or the like. Piston seals 875, 876, such as o-rings, isolate the fluid chamber 870 from other regions of the cavity 855. When fluid pressure (positive or negative) is applied to the fluid port 872, the piston 856 translates accordingly, moving with it any of the valve pin holders and/or sleeves described in the embodiments.

Figure 9:
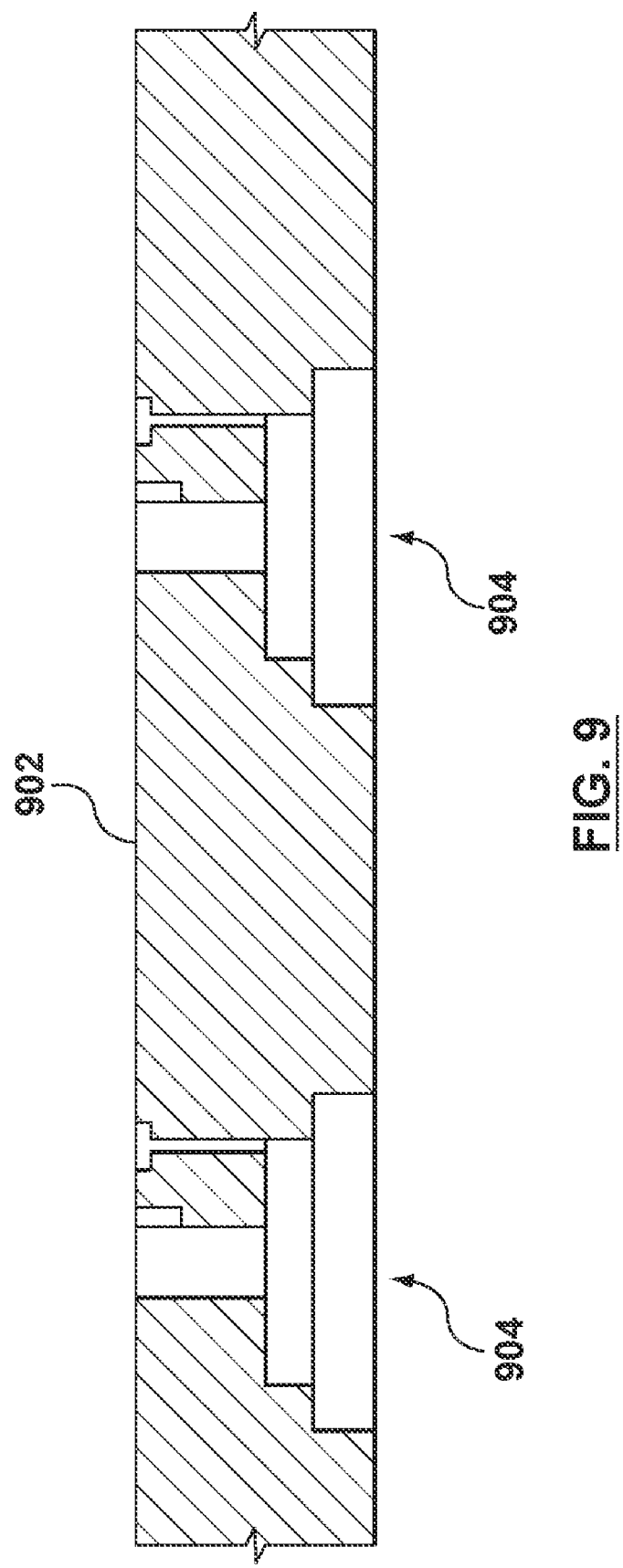
FIG. 9 is a sectional view of a back plate for use with embodiments of the invention.

FIG. 9 shows a back plate 902 that can be used with the embodiments described. One or more cavities 904 are provided in the back plate 902. The cavities 904 have a shape suitable for insertion of fixed and rotating electric motor parts, a piston, and other components of an actuator according to any of the embodiments described herein. Housing parts are connected to the back plate 902 to enclose the actuator parts in the cavity 904. In effect, the back plate 902 replaces the upper housing part (e.g., part 202 of FIG. 2).

Figure 10:
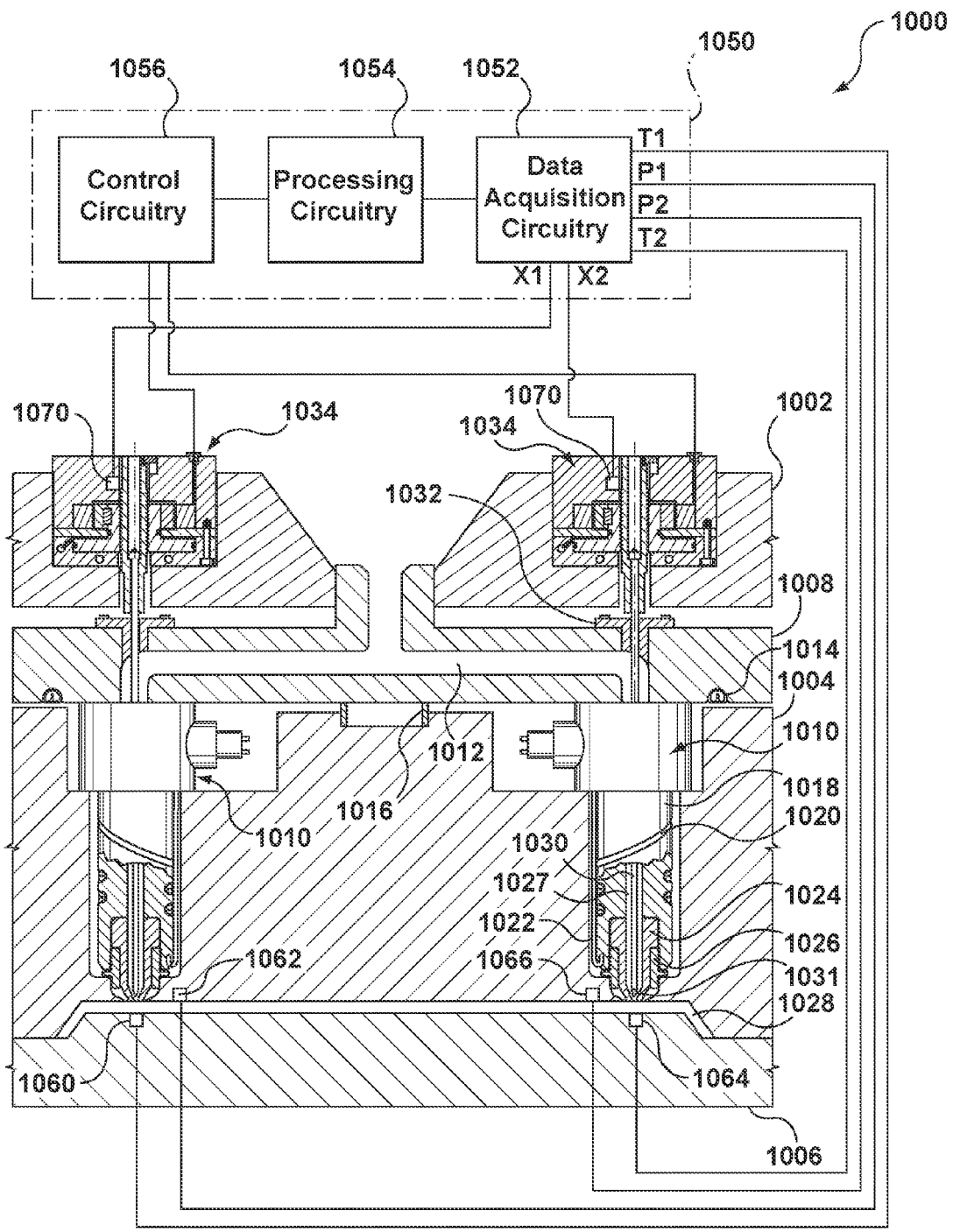
FIG. 10 is a partial sectional view of a sequential injection molding system according to an embodiment of the invention a partial cross-sectional view of a portion of an injection molding apparatus according to an embodiment of the present invention.

FIG. 10 shows a sequential injection molding system 1000 according to an embodiment of the invention. In the description of this embodiment, like reference numerals in the 1000 series are used to describe like parts for ease of understanding. The features and aspects described for the other embodiments can be used accordingly with the present embodiment.

The sequential injection molding system 1000 includes a back plate 1002 and mold plates 1004, 1006. A mold cavity 1028, in which a molded product is formed from solidified molding material (melt), is defined between the mold plates 1004, 1006. The mold plate 1006 typically retracts to eject the molded part from the mold cavity 1028.

A manifold 1008 is disposed between the back plate 1002 and the mold plate 1004. The manifold 1008 has a manifold melt channel 1012 and a manifold heater 1014, such as an electrical resistance heater in the form of an insulated heater wire. The manifold 1008 is offset from the mold plate 1004 by a locating ring 1016.

Nozzles 1010 are connected to the manifold 1008 and extend into wells formed in the mold plate 1004. Each nozzle 1010 includes a nozzle body 1018, which has a nozzle heater 1020 embedded therein. The nozzle heater 1020 can be an electrical resistance heater in the form of an insulated heater wire. A temperature sensor 1022, such as a thermocouple, is provided in the nozzle body 1018. The nozzle 1010 has a nozzle tip 1024 held to the nozzle body 1018 by a tip retainer 1026. A nozzle melt channel 1027 runs through the nozzle body 1018, communicating the manifold melt channel 1012 to the mold cavity 1028. The combination of heated manifold 1008 and heated nozzle 1018 is known as a hot runner. It is common for hot runners to have more than two nozzles to feed molding material to one or more mold cavities.

A valve pin 1030 extends from the back plate 1002 to the mold cavity 1028 through a valve pin bushing 1032 connected to the manifold 1008. The bottom end 1031 of the valve pin 1030 is tapered to match the tapered flow channel of the nozzle tip 1024, such that the vertical position of the bottom end 1031 of the valve pin 1030 defines the cross-sectional area for flow of molding material and thus the rate of molding material flow through the nozzle 1018. The tapered shapes can be replaced by other shapes capable of controlling flow of molding material. The top of the valve pin 1030 is connected to an actuator 1034 located in the back plate 1002. The actuator 1034 moves the valve pin 1030 up and down to control flow of molding material from the nozzle melt channel 1027 to the mold cavity 1028. The actuator 1034 has an electric mode of operation and a pressure mode of operation as described in the other embodiments.

The sequential injection molding system 1000 further includes a controller 1050 that comprises data acquisition circuitry 1052, processing circuitry 1054, and control circuitry 1056.

The data acquisition circuitry 1052 is connected to sensors that can include a first cavity temperature sensor 1060, a first cavity pressure sensor 1062, a second cavity temperature sensor 1064, and a second cavity pressure sensor 1066. The sensors 1060-1066 can be disposed in or near the mold cavity 1028 and in association with individual nozzles 1010 as is known in the art. In the example shown, the temperature and pressure of molding material flowing into the mold cavity 1028 from the left nozzle 1010 are measured by the sensors 1060, 1062 and sent to the data acquisition circuitry 1052 as T1 and P1. Likewise, the temperature and pressure associated with the right nozzle 1010 are sent to the data acquisition circuitry 1052 as T2 and P2. More or fewer sensors can be used, and the temperature sensors 1022 of the nozzles 1010 can also be connected to the data acquisition circuitry 1052. The data acquisition circuitry 1052 can also be connected to position sensors 1070 of the actuators 1034 that measure the positions of the valve pin holders and generate and send position signals X1, X2 to the data acquisition circuitry 1052.

The processing circuitry 1054 uses at least a portion of the data of the signals T1, P1, T2, P2, X1, and X2 to calculate positions of the valve pins 1030 to change one or more molding material flow rates to desired levels or maintain one or more molding material flow rates at current levels. Signals representing the required positions of the valve pins 1030 are sent to the control circuitry 1056.

The control circuitry 1056 sends control signals to the actuators 1034 according to the signals received from the processing circuitry 1054 to dynamically control the positions of the valve pins 1030. If increased flow of molding material is required at one nozzle 1010, the control circuitry 1056 controls that nozzle's actuator 1034 to move up; and if decreased flow of molding material is required at that nozzle 1010, the control circuitry 1056 controls the actuator 1034 to move down. The electric mode of the actuator 1030 is conducive to accurate control of molding material rate of flow, whereas the pressure mode of operation is conducive to shut off of material flow. Therefore, it is preferable that the electric mode be used to control molding material rate of flow and that the pressure mode be used to shut off molding material flow. Accordingly, the control circuitry 1056 need only control the electric mode of operation of the actuators 1034 and thus should be suitably connected to the electric motors of the actuators 1034. However, the control circuitry 1056 can readily be designed to control both the electric and pressure modes or even only the pressure mode of actuation, and thus can be connected to valves that control fluid supplies to the actuators 1034.

The actuators 1034 in combination with the controller 1050 allow control of molding material flow and packing pressure to improve filling of large single cavities (as shown) and multiple differently sized cavities (e.g., family molds). Knit line location can also be controlled.

The controller 1050 can be implemented with a typical computer, a specifically modified computer, or a specialized circuit. Software can be used in addition to hardware or firmware. All connections within, to, and from the controller 1050 can be wired or wireless.

Generally, for all the embodiments described, the pressure mode of actuation is capable of producing a greater actuation force than the electric mode, since pneumatic or hydraulic forces tend to be larger than forces produced by similarly sized electric motors. This means that the pressure mode can be used to close a mold gate against pressures higher than could be closed in the electric mode. Of course, if a larger electric motor or a smaller fluid chamber is selected, this relationship between the modes may not exist or may be opposite. Also, generally, the electric mode of actuation is continuous whereas the pressure mode is discrete. That is, the electric motor can be rotated by different amounts effecting different displacements of the valve pin, while the piston moving in response to fluid pressure is more of a toggling (open/close) response. This means that the electric mode can be used to position the valve pin more accurately. In coinjection applications, the melt controlled by the valve pin need not be pressurized as much as the melt controlled by the sleeve, which is conducive to the electric mode controlling the valve pin. Naturally, different designs of the embodiments of the invention may behave differently. Moreover, the pressure mode and the electric mode can be activated at the same time or at different times.

Regarding all the embodiments described, connecting the motor parts to the housing and the piston can be achieved by any known method, such as interference or friction fitting, bolts, and locking pieces. Likewise, connecting the valve pin to the valve pin holder can be achieved by any known method, such as those described above. Sealing of the piston to the housing can also be achieved in numerous known ways.

Applications for the embodiments described include dynamic feed of molding material(s), use in clean rooms, coinjection of more than one molding material, and sequential molding. Other applications will be apparent to those of ordinary skill in the art.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An actuator for a hot runner, comprising:
  a motor having a fixed part and a rotating part that is rotatable about an axis;
  a piston connected to the rotating part and able to rotate with the rotating part;
  a housing disposed around the piston, wherein the fixed part of the motor is fixed to the housing, the housing and piston together defining a fluid chamber, wherein the piston is slidable along the axis in response to fluid pressure applied to the fluid chamber; and
  a valve pin holder threadably connected to the piston, the threaded connection aligned with the axis, the valve pin holder rotationally fixed with respect to the housing and free to move along the axis when the piston rotates.

2. The actuator of claim 1, wherein the motor is an electric motor.

3. The actuator of claim 1, wherein the fixed part of the motor surrounds the rotating part of the motor.

4. The actuator of claim 1, wherein the rotating part of the motor surrounds the fixed part of the motor.

5. The actuator of claim 1, wherein the valve pin holder has an outside cylindrical surface having a thread and the piston has an inside cylindrical surface having a thread.

6. The actuator of claim 1, wherein the valve pin holder has an inside cylindrical surface having a thread and the piston has an outside cylindrical surface having a thread.

7. The actuator of claim 1, further comprising a key and slot that rotationally fix the valve pin holder with respect to the housing, one of the key and slot being provided on the housing and the other of the key and slot being provided on the valve pin holder.

8. The actuator of claim 1, wherein the valve pin holder has a non-circular diameter portion that mates with a non-circular hole in the housing to rotationally fix the valve pin holder with respect to the housing.

9. The actuator of claim 1, wherein the housing and piston together define another fluid chamber.

10. The actuator of claim 1, further comprising a sleeve holder connected to the piston, the sleeve holder for connection to a moveable sleeve.

11. The actuator of claim 1, further comprising a position sensor for measuring the position of the valve pin holder.

12. The actuator of claim 1, wherein the housing has a cooling channel near the valve pin holder.

13. The actuator of claim 1, wherein at least a part of the housing is a back plate.

14. An injection molding system, comprising:
  a manifold having a manifold melt channel;
  a nozzle having a nozzle melt channel in communication with the manifold melt channel;
  an actuator having a housing, a piston, and an electric motor; and
  a valve pin threadably connected to the piston for controlling flow of a molding material through the nozzle melt channel, the valve pin rotationally fixed with respect to the housing;
  wherein the electric motor is configured to rotate the piston to thereby translate the valve pin, and the piston is configured to translate in response to fluid pressure to thereby translate the valve pin.

15. The injection molding system of claim 14, further comprising a valve pin holder threadably connecting the valve pin to the piston.

16. The injection molding system of claim 15, wherein the valve pin holder has an outside cylindrical surface having a thread, and the piston has an inside cylindrical surface having a thread.

17. The injection molding system of claim 15, wherein the valve pin holder has an inside cylindrical surface having a thread, and the piston has an outside cylindrical surface having a thread.

18. The injection molding system of claim 14, wherein the electric motor comprises a rotating electric motor part electromagnetically coupled to a fixed electric motor part and connected to the piston, the rotating electric motor part and the piston rotating in response to energizing of one or both of the fixed electric motor part and the rotating electric motor part.

19. The injection molding system of claim 18, wherein the fixed electric motor part surrounds the rotating electric motor part.

20. The injection molding system of claim 18, wherein the rotating electric motor part surrounds the fixed electric motor part.

21. A coinjection molding system comprising:
- a nozzle having a first melt channel and a second melt channel;
- an actuator having a housing, a piston, and an electric motor;
- a first flow control device connected to the piston for controlling flow of a first molding material through the first melt channel; and
- a second flow control device threadably connected to the piston for controlling flow of a second molding material through the second melt channel,
- wherein the electric motor is configured to controllably rotate the piston to thereby translate the second flow control device, and the piston is configured to translate in response to fluid pressure to thereby translate the first flow control device and the second flow control device.

22. The coinjection molding system of claim 21, wherein the first flow control device is a sleeve and the second flow control device is a valve pin.

23. The coinjection molding system of claim 22, further comprising a sleeve holder connecting the sleeve to the piston and a valve pin holder threadably connecting the valve pin to the piston.

24. A sequential injection molding system comprising:
- a nozzle having a melt channel;
- an actuator having a housing, a piston, and an electric motor;
- a valve pin threadably connected to the piston for controlling flow of molding material through the nozzle melt channel, the valve pin being rotationally fixed with respect to the housing;
- a sensor disposed in a mold cavity in communication with the melt channel; and
- a controller connected to the sensor and to the electric motor of the actuator, the controller for controlling rotation of the piston according to measurement of the sensor,
- wherein the electric motor is configured to rotate the piston to thereby translate the valve pin, and the piston is configured to translate in response to fluid pressure to thereby translate the valve pin.

25. The sequential injection molding system of claim 24, wherein the sensor is a temperature sensor or a pressure sensor.

26. The sequential injection molding system of claim 24, further comprising a position sensor for measuring the position of the valve pin, wherein the controller is connected to the position sensor for controlling rotation of the piston according to measurement of the position sensor.

* * * * *